United States Patent [19]

Matsuki et al.

[11] Patent Number: 4,972,814
[45] Date of Patent: Nov. 27, 1990

[54] COMBUSTION SYSTEM OF AN INTERNAL COMBUSTION ENGINE

[75] Inventors: Mitsuo Matsuki; Akira Akimoto, both of Tokyo

[73] Assignee: Fuji Jukogyo Kabushiki Kaisha, Tokyo, Japan

[21] Appl. No.: 453,968

[22] Filed: Dec. 20, 1989

[30] Foreign Application Priority Data

Dec. 27, 1988 [JP] Japan .................. 63-334878

[51] Int. Cl.$^5$ .................................. F02B 31/00
[52] U.S. Cl. ........................ 123/308; 123/661; 123/52 M
[58] Field of Search ............ 123/52 M, 308, 661

[56] References Cited

U.S. PATENT DOCUMENTS 4,543,931 10/1985 Hitomi et al. .............. 123/52 M

FOREIGN PATENT DOCUMENTS

60-198329 10/1985 Japan ........................... 123/308
62-96731 5/1987 Japan ........................... 123/308

Primary Examiner—E. Rollins Cross
Attorney, Agent, or Firm—Beveridge, DeGrandi & Weilacher

[57] ABSTRACT

The present invention relates to a combustion system of an internal combustion engine having a combustion chamber with two inlet openings and at least one outlet opening, an intake manifold for inducing mixture, two intake ports bifurcated from the intake manifold and communicated with the corresponding inlet openings and a swirl control valve disposed in the intake manifold. The combustion system has an improvement wherein a side passage in a spiral shape for guiding the mixture by bypassing the swirl control valve is formed along with the intake manifold and one of the intake ports from an upstream side of the swirl control valve to the inlet opening. The swirl control valve is arranged with a predetermined inclination so as to position an edge of the swirl control valve facing to the side passage to the upstream side of the other edge of the swirl control valve when the swirl control valve is fully closed. Furthermore, the combustion chamber is asymmetrically formed by a plurality of swelling portions extending from an inner surface of the combustion chamber so as to provide squish areas. The squish area is arranged at a portion between the outlet openings and the inlet opening to which the side passage is not formed, and at a portion between the inlet openings. Thus the stable combustion efficiency is remarkably improved as well as the output efficiency and the full efficiency over the full range of the load operation period of the engine is improved.

4 Claims, 7 Drawing Sheets

SQUISH SHAPE OF COMBUSTION CHAMBER

FIG. 11

COMBUSTION SYSTEM OF AN INTERNAL COMBUSTION ENGINE

BACKGROUND OF THE INVENTION

The present invention relates to a combustion system of an internal combustion engine and, more particularly, to an improvement of a combustion system includes an intake passage and a combustion chamber with two intake valves for improving the combustion efficiency. And, the output efficiency of the entire operation area is improved by the synergetic effect due to generation of the swirl and squish effect in the combustion chamber.

In a conventional technique for this technical field, there has been provided an intake system of an engine of a vehicle for improving the combustion efficiency and the output efficiency by the structure or shape of the combustion chamber.

For example, in order to improve the combustion efficiency, the Japanese Patent Laid-open Publication No. 58-117315 discloses a structure of combustion chamber of an internal combustion engine wherein the curvature of a recessed spherical surface of the combustion chamber on the intake side is made as large as possible so as not to weaken the main intake flow from a helical intake passage.

With the prior art described above, however, the intake flow collides with a plug wall and is thus bent. Accordingly, the energy loss of the intake flow is made large, so that attenuation of a swirl of the intake flow is caused. It is, therefore, difficult to attain effects due to the swirl and squish flow. In particular, the combustion is not stably performed in a low load operation period of the engine. This is a significant problem for the effective combustion of the internal combustion engine.

SUMMARY OF THE INVENTION

An object of the present invention is to substantially eliminate the defects and drawbacks encountered in the prior art and to provide a combustion chamber of an internal combustion engine having an improved structure capable of increasing the generation of the swirl and mixture flow rate in the combustion chamber. The combustion efficiency during the entire operation period of the engine is improved and thereby improving the output efficiency and the fuel consumption.

This and other objects can be achieved according to the present invention by providing a combustion system of an internal combustion engine having a combustion chamber with two inlet openings and at least one outlet opening, an intake manifold for inducing mixture, two intake ports bifurcated from the intake manifold and communicated with the corresponding inlet openings and a swirl control valve disposed in the intake manifold. The combustion system has an improvement wherein a side passage (groove) in a spiral shape for guiding the mixture by bypassing the swirl control valve formed along with the intake manifold and one of the intake ports from an upstream side of the swirl control valve to the inlet opening. The swirl control valve is arranged with a predetermined inclination so as to position an edge of the swirl control valve facing to the side passage to the upstream side of the other edge of the swirl control valve when the swirl control valve is fully closed. Furthermore, the combustion chamber is asymmetrically formed by a plurality of swelling portions extending from an inner surface of the combustion chamber so as to provide squish areas. The squish area is arranged at a portion between the outlet openings and the inlet opening to which the side passage is not formed, and at a portion between the inlet openings.

According to the combustion system of the character described above, the intake manifold is closed by the swirl control valve through an actuator which is actuated by a negative pressure in the intake pipe during an idling operation period and the low load operation period of the engine. The mixture (fluid) passing the intake manifold flows along the side groove formed in the region between the side groove formed in the intake manifold on the upstream side of the swirl control valve and the directly upstream side of the intake valve of one of the intake ports. The mixture then flows into the combustion chamber through the intake port. With this flow of the mixture, the upper end edge of the swirl control valve is inclined in a direction for scraping the mixture flow. The side groove of the intake port is spirally formed so that the swirl is caused in an increased manner and the mixture flow rate increases. The squish flow in the combustion chamber is also increased, whereby the combustion efficiency in the combustion chamber during the low speed operation period and low load operation period of the engine can be improved by the synergetic effect of the swirl and the squish effect.

The negative pressure in the intake pipe for operating the swirl control valve is made small thereby opening the swirl control valve. And then the mixture flows into the combustion chamber through the two intake ports when the engine is driven with a neutral or high load. During these operations, the mixture passage area between the intake manifold and the intake port can be ensured. The wall surface flow of the mixture induced into the combustion chamber through the intake port is caused and a desired turbulent flow of the mixture is also caused in the combustion chamber due to the squish flow. Thus the stable combustion efficiency is remarkably improved as well as the output efficiency and the fuel efficiency over the full range of the load operation period of the engine is improved.

DESCRIPTION OF THE PREFERRED EMBODIMENT

A preferred embodiment of the present invention will become understood from the following detailed description referring to the accompanying drawings.

Figure 1:
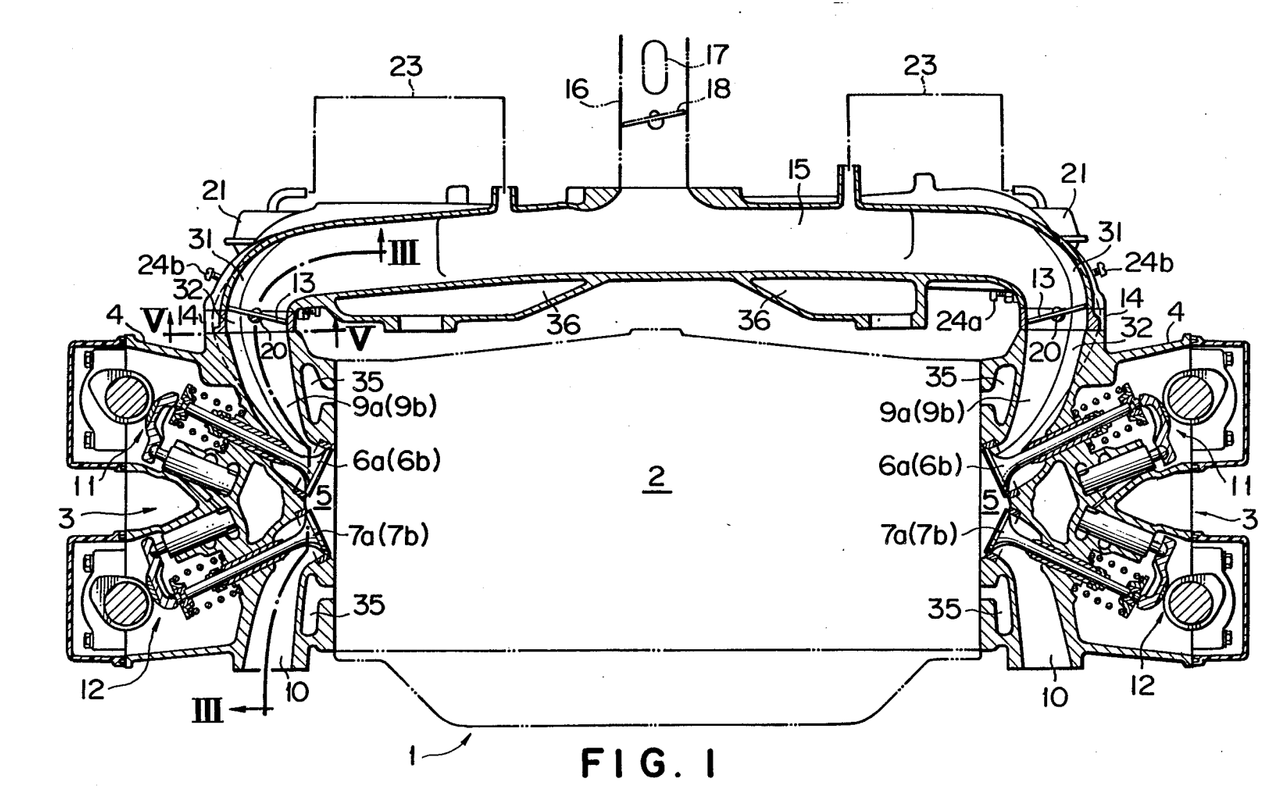
FIG. 1 shows a schematic structure of an intake system of a two intake valve type horizontal opposed four cylinder engine according to the present invention.
Figure 2:
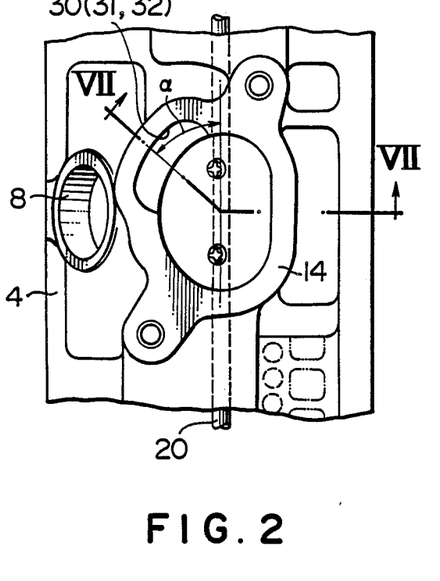
FIG. 2 is a front view showing an inlet portion of an intake port of a cylinder head of the engine shown in FIG. 1.

Referring to FIG. 1, a four-cylinder engine unit is provided with an engine body 1 in which a crank case 2 is located. The crank case 2 is provided with right and left banks 3 and 3 to which cylinder heads 4 and 4, each having a combustion chamber 5, are mounted, respectively. Each of the combustion chambers 5 and 5 is provided with two inlet openings 6′a and 6′b of corresponding intake valves 6a and 6b into which intake valves 6a and 6b are mounted and provided with two outlet openings 7′a and 7′b of corresponding exhaust valve 7a and 7b into which exhaust valves 7a and 7b are mounted, as shown in FIG. 2. A hollow 8 to which an ignition plug is mounted is formed at substantially the central portion of each combustion chamber 5.

The two inlet openings 6′a and 6′b communicate with bifurcated intake ports 9a and 9b and the two outlet openings 7′a and 7′b communicate with an exhaust port 10. Thus the intake valves 6a and 6b and the exhaust valves 7a and 7b can be operated to be opened or closed at predetermined timings by an intake system operating valve mechanisms 11 and 11 and discharge system operating valve mechanisms 12 and 12, respectively.

The intake system will be described hereunder mainly with reference to FIG. 3. The intake ports 9a and 9b formed in the cylinder heads 4 and 4 on the sides of the right and left banks 3 and 3 are connected to a curved intake manifold 15 through swirl control valve bodies 14 and 14 provided with swirl control valves (hereinafter called "SCV") 13 and 13. An intake pipe 16 for inducing an air from an air cleaner (not shown), is connected to substantially a central portion of the intake manifold 15. An injector 17 for injecting a fuel and a throttle valve 18 for controlling intake air amount are provided in the intake pipe 16.

The banks 3 and 3 are arranged symmetrically, so that the righthand bank 3 will be described hereunder for the convenience's sake.

The SCV body 14 is provided with a flange 14a coupled to the cylinder head 4 through a gasket 19b. The flange 14a is coupled to a flange 15a of the intake manifold 15 through a spacer 19 and a gasket 19a.

A shaft 20 to which a butterfly type SCV 13 is secured is disposed in the SCV body 14. The shaft 20 is pivotably supported in the SCV body 14 so as to be rotated as shown in FIG. 4, through an operating rod 21b and a link 22 by a diaphragm type actuator 21.

The actuator 21 is provided with a diaphragm chamber 21a wherein a negative pressure in the intake pipe 16 into the intake manifold 15 is induced through a negative pressure passage 23. The operating rod 21b is accordingly moved upward or downward in response to the magnitude of the negative pressure in the intake pipe 16 which is variable in dependency on the operating condition, whereby the opening degree of the SCV 13 is controlled. As shown in FIGS. 4 to 6, the fully opened position and the fully closed position of the SCV 13 within the operating angle thereof are limited by stopper members 24a and 24b, respectively.

Figures 4, 5, 6, 7:
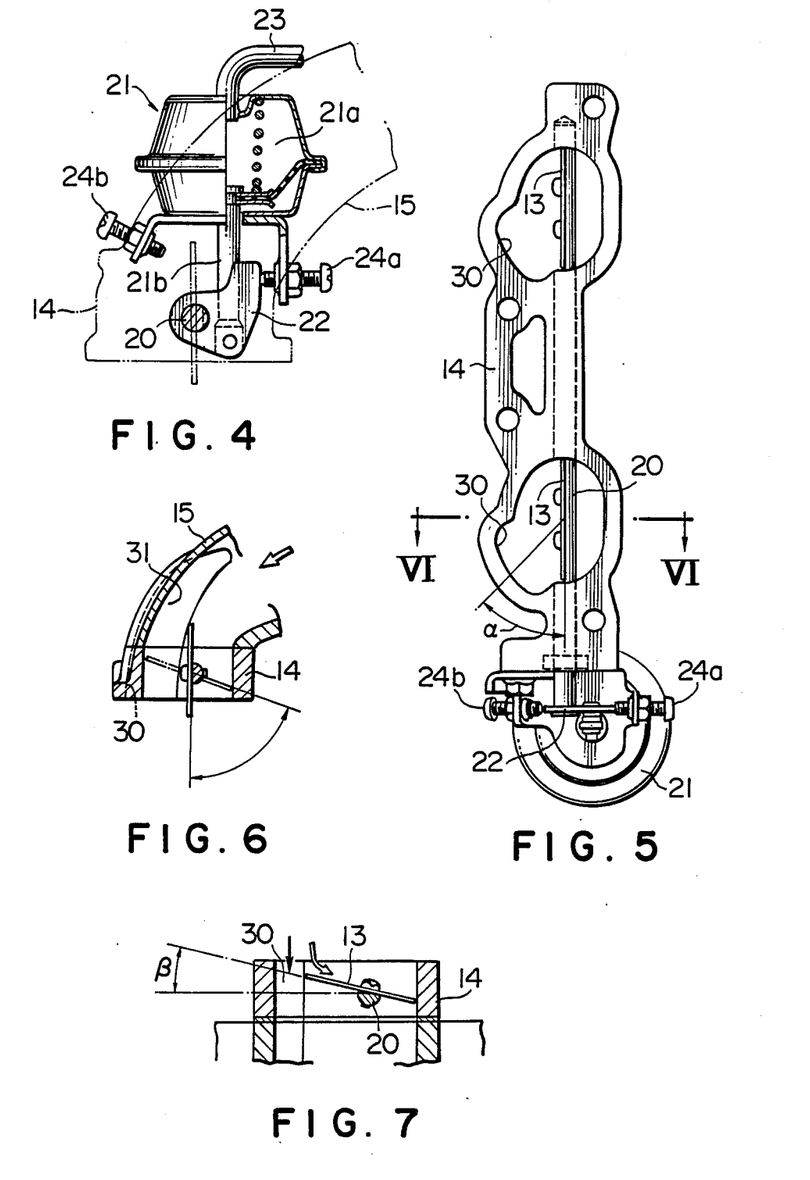
FIG. 4 is a front view, partially broken, of an actuator of the engine shown in FIG. 1.
FIG. 5 is a sectional view taken along the line V—V shown in FIG. 1.
FIG. 6 is a sectional view taken along the line VI—VI shown in FIG. 5.
FIG. 7 is a sectional view taken along the line VII—VII shown in FIG. 2.
Figure 8A:
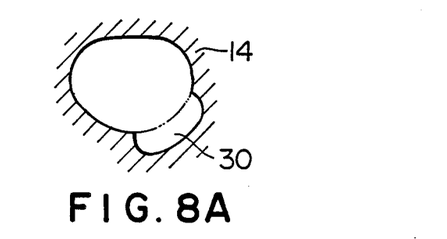
FIGS. 8a to 8k show sectional shapes of the intake port in various positions as viewed in arrowed directions A to K in FIG. 3, respectively, during the operation of the engine according to the present invention.
Figure 8B:
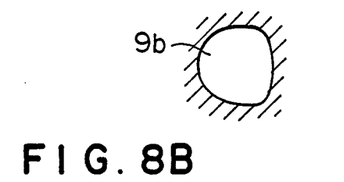
Figure 8C:
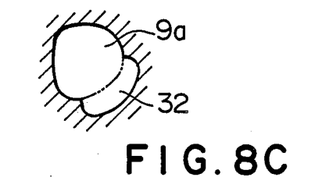
Figure 8D:
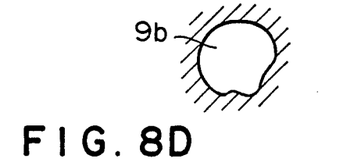
Figure 8E:
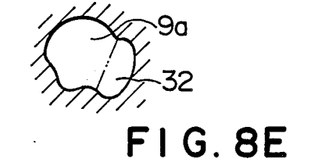
Figure 8F:
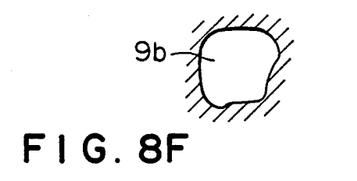
Figure 8G:
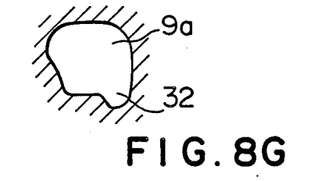
Figure 8H:
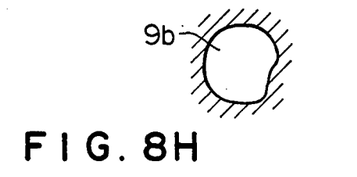
Figure 8I:
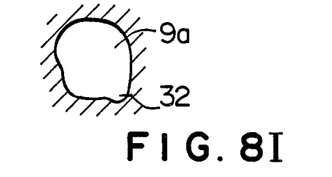
Figure 8J:
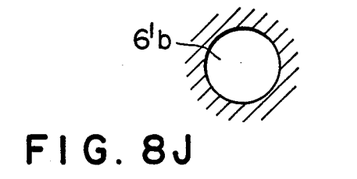
Figure 8K:
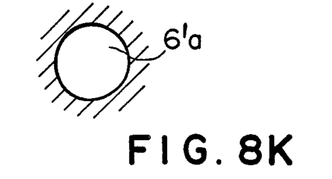
Figure 9:
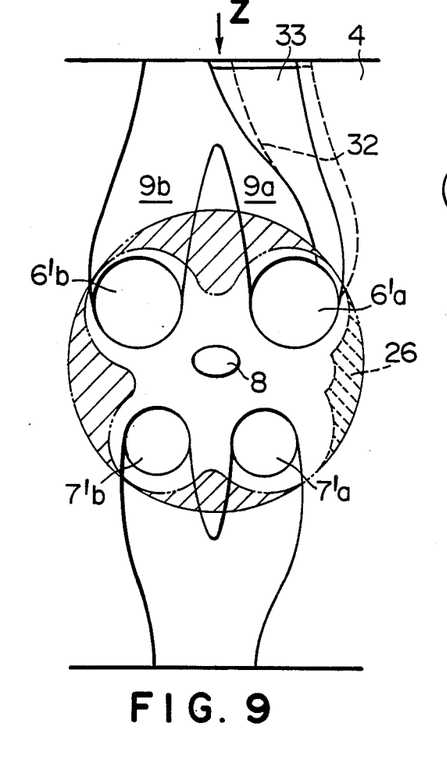
FIG. 9 is another example of an intake port according to the present invention.

The shaft 20 for the SCV 13, as shown in FIG. 5, disposed in correspondence to two cylinders arranged on the side of the righthand side bank 3 so that the SCVs 13 and 13 in the SCV bodies 14 and 14 are integrally operated.

In the meantime, the SCV 13 arranged in the SCV body 14 is set as shown in FIGS. 2 and 7 so that the inclination β of the SCV 13 is within 5° to 30° in the fully closed state thereof. A side groove 30 having a deviation angle α(30° to 45°) in a direction for scraping an air-fuel mixture (hereinafter called "a mixture") flow by the upper edge of the SCV 13 with respect to the axis of the shaft 20 is formed along the upper wall surface of a mixture passage.

Side grooves (passages) 31 and 32 are formed in the intake manifold 15 connected to the upstream side of the SCV body 14 and one intake port 9a of the cylinder head 4 connected to the downstream side of the SCV body 14. The side grooves 31 and 32 communicate with the side groove 30 formed in the SCV body 14 and have shapes so as not to prevent the mixture flow as shown in FIGS. 1 and 3.

Namely, the side groove 31 formed along the upper wall surface of the mixture passage of the intake manifold 15 extends, by a suitable length, in the intake manifold 15 on the upstream side of the SCV 13. The side groove 32 formed in the intake port 9a extends directly above the upstream side of the inlet opening 6′a.

Figure 3:
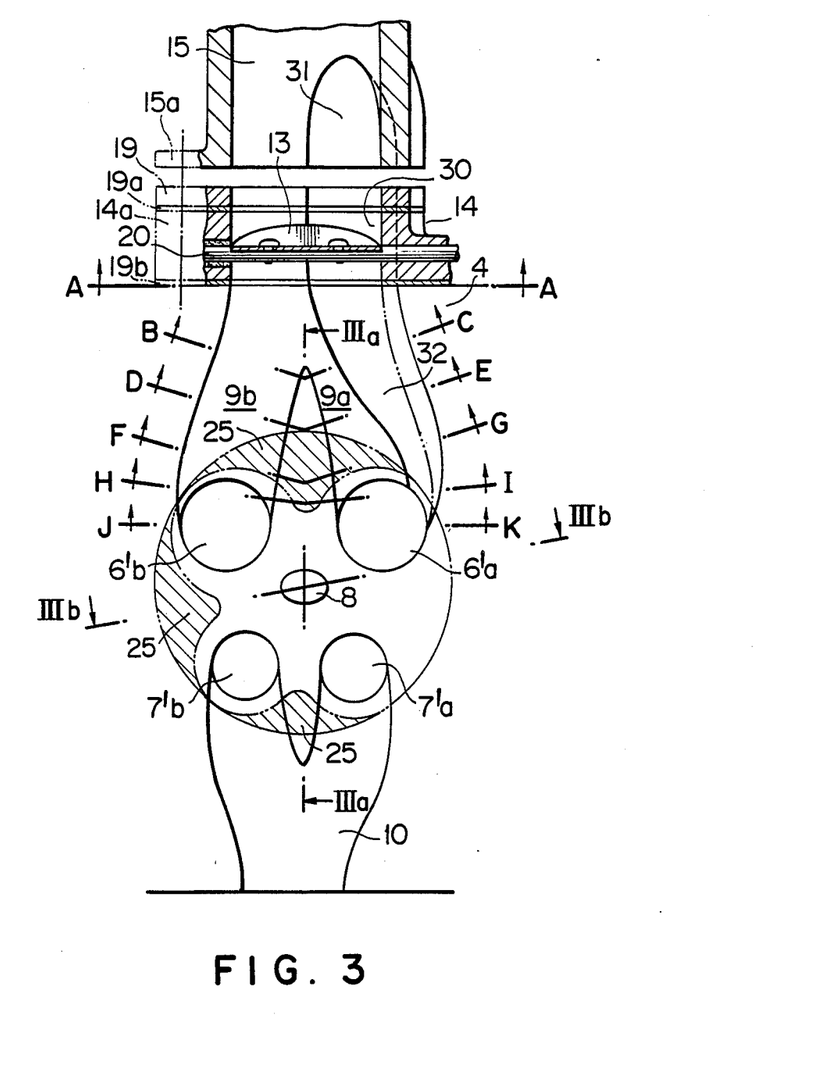
FIG. 3 is a sectional view taken along the line III—III shown in FIG. 1.

The side groove 32 of the intake port 9a is formed, as shown in FIGS. 3 and 8, in a slightly spiral form. The portion of the side groove 32 in the vicinity of the inlet opening 6′a extends towards the tangential direction of the combustion chamber 5 thereby causing the swirl in the mixture passing the side groove 32.

Figure 3A:
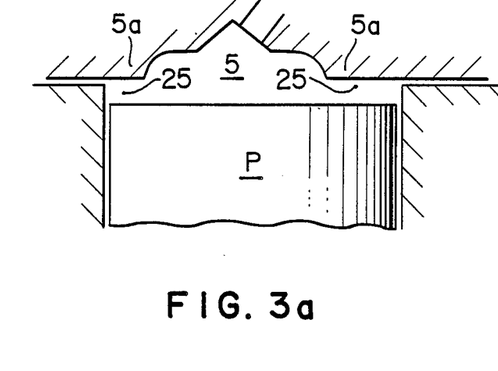
FIG. 3a is a sectional view taken along the line IIIa–IIIa shown in FIG. 3.
Figure 3B:
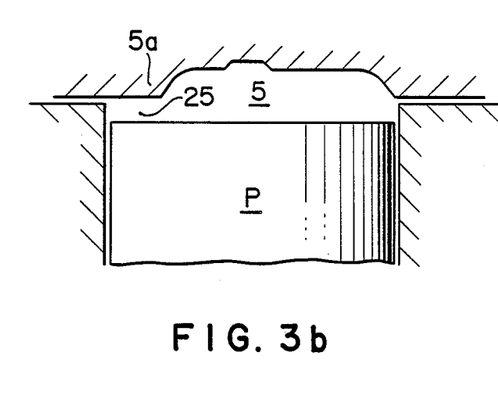
FIG. 3b is a sectional view taken along the line IIIb–IIIb in FIG. 3.

The combustion chamber 5 is asymmetrically formed by a plurality of swelling portions 5a extending from an inner surface of the combustion chamber as shown in Figs. 3, 3a and 3b, so that asymmetrical squish areas 25 with hatching lines are formed between the swelling portions 5a and a piston 9.

Namely, the squish areas 25 are formed at the peripheral portions of the inlet openings 6′a and 6′b and the outlet openings 7′a and 7′b in the combustion chamber 5. The squish areas 25 are, however, formed asymmetrically with respect to the two inlet openings 6′a and 6′b and the two outlet openings 7′a and 7′b. No squish area is provided on the downstream side of one inlet opening 6′a for the intake mixture induced from the side grooves 31 and 32 formed between the intake manifold 15 and the intake port 9a.

Referring to FIG. 1, water jackets 35 and 35 are provided for passing the cooling water into the cylinder heads 4 and 4 of the banks 3 and 3, respectively. Cooling water passages 36 and 36 for performing intake preheating function are provided for the intake manifold 15.

The engine unit having the improved combustion chamber according to the embodiment of the present invention described above is of a single point injection type wherein the injector 17 is provided for the intake pipe 16. But the embodiment may be applied to a multipoint injection type engine unit wherein the injectors are disposed directly upstream of the side passages 31 and 32 corresponding to the respective cylinders.

The combustion chamber of the internal combustion engine of the structure described above will operate as follows.

First, during the low load operation period including an idling operation of the engine, the negative pressure is introduced into the diaphragm chamber 21a of the actuator 21 due to the negative pressure in the intake pipe 16 of the intake manifold 15. The operating rod 21b is lifted and the SCV 13 is closed in the SCV body 14. In this time, the mixture is induced in the side groove 31 of the intake manifold 15, passes the side groove 30 of the SCV body 14 and then passes along the side groove 32 of the intake port 9a. The intake valve 6a is accordingly opened and the mixture is induced into the combustion chamber 5.

The flow of the mixture in the side groove 31 of the intake manifold 15 is partially diminished by the SCV 13, so that the air-fuel mixture passing the spiral side groove 32 of the intake port 9a flows in layers. In addition, the swirl ratio increases and a turbulent flow of the mixture is caused in the combustion chamber 5. However, since the mixture flows into no squish area in the combustion chamber 5, the swirl exists, without reducing the swirl ratio, and finishes the compression process as described hereinafter. Thus combustion during the low load operation period can be performed effectively.

In the next step, the engine load increases to the middle or high load operation period. During this period, the negative pressure in the intake pipe for operating the SCV 13 reduces and the operating rod 21a of the actuator 21 descends. The SCV 13 is opened and the mixture is induced into the combustion chamber 5 through the intake ports 9a and 9b. The mixture flown from the intake port 9a causes a wall surface flow due to the location of the side groove 32 thereby causing the turbulent flow in the combustion chamber 5 and the combustion is facilitated by the synergetic effect with the squish effect.

Figure 10:
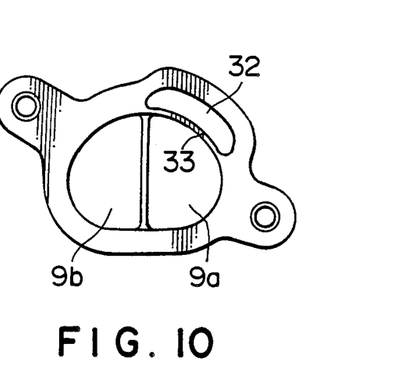
FIG. 10 shows the intake port viewed from the direction Z in FIG. 9.
Figure 11:
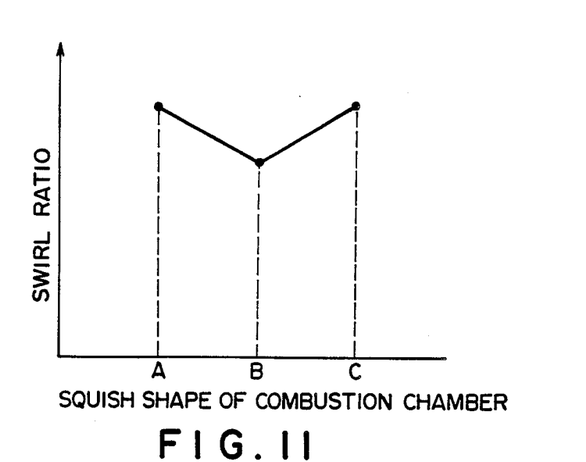
FIG. 11 is a graph representing the experimental result with respect to the squish shapes of the combustion chamber and the swirl ratio.

FIGS. 10 and 11 represent another embodiment according to the present invention, wherein a partition wall 33 is provided only for the side groove 32 formed in one intake port 9a to increase the swirl ratio of the air-fuel mixture passing through the side groove 32 of the intake port 9a during the middle or high load operation periods. Thus the combustion can be improved.

FIG. 11 is a graph showing a result of the intake air continuous flow test based on the existence of the squish area in the combustion chamber 5. In the graph of FIG. 11, the letter A represents an asymmetrical squish area 25 formed in a portion between the inlet opening 6'b and the outlet opening 7'b and not between the inlet opening 6'a and the outlet opening 7'a. The letter B represents a squish area 26 which is symmetrical with the squish area 25 and is formed at a lower portion of the intake valve 6a. The letter C represents a case where no squish area is formed. As is understood from FIG. 11, it was found that substantially the same swirl ratio is obtained in the cases A and C of FIG. 11.

Accordingly, as the engine operation reaches the final stage of the compression stroke, the swirl ratio is suppressed and the swirl is changed into the turbulent flow. However, the generation of the turbulent flow is further facilitated by the squishing effect of the squish flow. Thus the synergetic effect of the swirl and the squish can be attained.

The SCV 13 is fully opened when the engine operation reaches the middle or high load operation period. The mixture flows substantially uniformly through the intake valves 6a and 6b. During this period, although the swirl is reduced, the squish effect in the combustion chamber 5 is increased, thus producing the turbulent flow and, hence, improving the combustion.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A combustion system of an internal combustion engine having a combustion chamber with two inlet openings and at least one outlet opening, an intake manifold for inducing fluid, two intake ports bifurcated from the intake manifold and communicated with the corresponding inlet openings and a swirl control valve disposed in the intake manifold, comprising:

a side passage in a spiral shape for guiding the fluid by bypassing the swirl control valve formed along with the intake manifold and one of the intake ports from an upstream side of the swirl control valve to the inlet opening, the swirl control valve arranged with a determined inclination so as to position an edge of the swirl control valve facing the side passage to the upstream side of the other edge of the swirl control valve when the swirl control valve is fully closed, and the combustion chamber asymmetrically formed by a plurality of swelling portions extending from an inner surface of the combustion chamber to provide squish areas, said squish areas arranged at a portion between the outlet openings and the inlet opening to which the side passage is not formed and at a portion between the inlet openings.

2. The combustion system according to claim 1, wherein said inclination of the swirl control valve is in a range of 5° to 30°.

3. The combustion system according to claim 1, wherein said side passage is opening into the intake manifold and the intake port.

4. The combustion system according to claim 1, wherein said side passage is separated from the intake manifold and the intake port with a partition wall.

* * * * *